US012002168B2

(12) United States Patent
Bajana et al.

(10) Patent No.: US 12,002,168 B2
(45) Date of Patent: Jun. 4, 2024

(54) LOW LATENCY HAND-TRACKING IN AUGMENTED REALITY SYSTEMS

(71) Applicant: Snap Inc., Santa Monica, CA (US)

(72) Inventors: Jan Bajana, Vienna (AT); Bernhard Jung, Perchtoldsdorf (AT); Daniel Wagner, Vienna (AT)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/844,541

(22) Filed: Jun. 20, 2022

(65) Prior Publication Data
US 2024/0096026 A1 Mar. 21, 2024

(51) Int. Cl.
G06T 19/00 (2011.01)
G06T 7/20 (2017.01)
G06T 15/00 (2011.01)

(52) U.S. Cl.
CPC .............. G06T 19/006 (2013.01); G06T 7/20 (2013.01); G06T 15/005 (2013.01); G06T 2200/28 (2013.01); G06T 2207/30196 (2013.01)

(58) Field of Classification Search
None
See application file for complete search history.

(56) References Cited

U.S. PATENT DOCUMENTS

| 7,971,156 | B2 | 6/2011 | Albertson et al. |
| 7,996,793 | B2 | 8/2011 | Latta et al. |
| 8,487,938 | B2 | 7/2013 | Latta et al. |
| 8,856,691 | B2 | 10/2014 | Geisner et al. |
| 9,225,897 | B1 | 12/2015 | Sehn et al. |
| 9,230,160 | B1 | 1/2016 | Kanter |
| 9,276,886 | B1 | 3/2016 | Samaranayake |
| 9,705,831 | B2 | 7/2017 | Spiegel |

(Continued)

FOREIGN PATENT DOCUMENTS

| CN | 103049761 | 8/2016 |
| EP | 3707693 | 9/2020 |

(Continued)

OTHER PUBLICATIONS

"International Application Serial No. PCT/US2023/068110, International Search Report dated Sep. 28, 2023", 3 pgs.

(Continued)

*Primary Examiner* — Yinghun He
(74) *Attorney, Agent, or Firm* — Schwegman Lundberg & Woessner, P.A.

(57) ABSTRACT

A method for reducing motion-to-photon latency for hand tracking is described. In one aspect, a method includes accessing a first frame from a camera of an Augmented Reality (AR) device, tracking a first image of a hand in the first frame, rendering virtual content based on the tracking of the first image of the hand in the first frame, accessing a second frame from the camera before the rendering of the virtual content is completed, the second frame immediately following the first frame, tracking, using the computer vision engine of the AR device, a second image of the hand in the second frame, generating an annotation based on tracking the second image of the hand in the second frame, forming an annotated virtual content based on the annotation and the virtual content, and displaying the annotated virtual content in a display of the AR device.

20 Claims, 13 Drawing Sheets

(56) References Cited

U.S. PATENT DOCUMENTS

| | | | |
|---|---|---|---|
| 9,742,713 B2 | 8/2017 | Spiegel et al. | |
| 9,858,637 B1* | 1/2018 | Quach | G06F 3/012 |
| 10,102,423 B2 | 10/2018 | Shaburov et al. | |
| 10,284,508 B1 | 5/2019 | Allen et al. | |
| 10,439,972 B1 | 10/2019 | Spiegel et al. | |
| 10,509,466 B1 | 12/2019 | Miller et al. | |
| 10,514,876 B2 | 12/2019 | Sehn | |
| 10,579,869 B1 | 3/2020 | Xiong et al. | |
| 10,591,730 B2 | 3/2020 | Rodriguez, II et al. | |
| 10,614,855 B2 | 4/2020 | Huang | |
| 10,748,347 B1 | 8/2020 | Li et al. | |
| 10,958,608 B1 | 3/2021 | Allen et al. | |
| 10,962,809 B1 | 3/2021 | Castañeda | |
| 10,996,846 B2 | 5/2021 | Robertson et al. | |
| 10,997,787 B2 | 5/2021 | Ge et al. | |
| 11,012,390 B1 | 5/2021 | Al Majid et al. | |
| 11,030,454 B1 | 6/2021 | Xiong et al. | |
| 11,036,368 B1 | 6/2021 | Al Majid et al. | |
| 11,062,498 B1 | 7/2021 | Voss et al. | |
| 11,087,728 B1 | 8/2021 | Canberk et al. | |
| 11,092,998 B1 | 8/2021 | Castañeda et al. | |
| 11,106,342 B1 | 8/2021 | Al Majid et al. | |
| 11,126,206 B2 | 9/2021 | Meisenholder et al. | |
| 11,143,867 B2 | 10/2021 | Rodriguez, II | |
| 11,169,600 B1 | 11/2021 | Canberk et al. | |
| 11,227,626 B1 | 1/2022 | Krishnan Gorumkonda et al. | |
| 11,307,747 B2 | 4/2022 | Dancie et al. | |
| 11,531,402 B1 | 12/2022 | Stolzenberg | |
| 11,546,505 B2 | 1/2023 | Canberk | |
| 2009/0012788 A1 | 1/2009 | Gilbert et al. | |
| 2011/0301934 A1 | 12/2011 | Tardif | |
| 2014/0171036 A1 | 6/2014 | Simmons | |
| 2015/0120293 A1 | 4/2015 | Wohlert et al. | |
| 2015/0370320 A1 | 12/2015 | Connor | |
| 2017/0123487 A1 | 5/2017 | Hazra et al. | |
| 2017/0277684 A1 | 9/2017 | Dharmarajan Mary | |
| 2017/0277685 A1 | 9/2017 | Takumi | |
| 2017/0351910 A1 | 12/2017 | Elwazer et al. | |
| 2018/0158370 A1 | 6/2018 | Pryor | |
| 2019/0146219 A1 | 5/2019 | Rodriguez, II | |
| 2021/0011612 A1 | 1/2021 | Dancie et al. | |
| 2021/0074016 A1 | 3/2021 | Li et al. | |
| 2021/0166732 A1 | 6/2021 | Shaburova et al. | |
| 2021/0174034 A1 | 6/2021 | Retek et al. | |
| 2021/0201853 A1* | 7/2021 | Manfred | G02B 27/0101 |
| 2021/0241529 A1 | 8/2021 | Cowburn et al. | |
| 2021/0303075 A1 | 9/2021 | Cowburn et al. | |
| 2021/0303077 A1 | 9/2021 | Anvaripour et al. | |
| 2021/0303140 A1 | 9/2021 | Mourkogiannis | |
| 2021/0382564 A1 | 12/2021 | Blachly et al. | |
| 2021/0397000 A1 | 12/2021 | Rodriguez, II | |
| 2021/0405761 A1 | 12/2021 | Canberk | |
| 2022/0188539 A1 | 6/2022 | Chan et al. | |
| 2022/0206298 A1* | 6/2022 | Goodman | G06F 3/0481 |
| 2022/0206588 A1 | 6/2022 | Canberk et al. | |
| 2022/0300730 A1 | 9/2022 | Eirinberg et al. | |
| 2022/0300731 A1 | 9/2022 | Eirinberg et al. | |
| 2022/0301231 A1 | 9/2022 | Eirinberg et al. | |
| 2022/0326781 A1 | 10/2022 | Hwang et al. | |
| 2022/0334649 A1 | 10/2022 | Hwang et al. | |
| 2022/0375174 A1 | 11/2022 | Arya et al. | |

FOREIGN PATENT DOCUMENTS

| | | |
|---|---|---|
| EP | 3848781 | 7/2021 |
| EP | 4172726 | 5/2023 |
| EP | 4172730 | 5/2023 |
| KR | 20220158824 | 12/2022 |
| WO | 2016168591 | 10/2016 |
| WO | 2019094618 | 5/2019 |
| WO | 2022005687 | 1/2022 |
| WO | 2022005693 | 1/2022 |
| WO | 2022060549 | 3/2022 |
| WO | 2022066578 | 3/2022 |
| WO | 2022060549 | 4/2022 |
| WO | 2022132381 | 6/2022 |
| WO | 2022146678 | 7/2022 |
| WO | 2022198182 | 9/2022 |
| WO | 2022216784 | 10/2022 |
| WO | 2022225761 | 10/2022 |
| WO | 2022245765 | 11/2022 |
| WO | 2023250257 | 12/2023 |

OTHER PUBLICATIONS

"International Application Serial No. PCT/US2023/068110, Written Opinion dated Sep. 28, 2023", 7 pgs.

* cited by examiner

FIG. 9 - PRIOR ART

LOW LATENCY HAND-TRACKING IN AUGMENTED REALITY SYSTEMS

TECHNICAL FIELD

The subject matter disclosed herein generally relates to a display system. Specifically, the present disclosure addresses systems and methods for reducing annotations latency in hand-tracking of augmented reality (AR) devices.

BACKGROUND

Augmented reality (AR) systems present virtual content to augment a user's real world environment. For example, virtual content overlaid over a physical object can be used to create the illusion that the physical object is moving, animated, etc. An augmented reality device worn by a user continuously updates presentation of the virtual content based on the user's movements to create the illusion that the virtual content is physically present in the user's real world environment. For example, as the user moves their head, the augmented reality device updates presentation of the virtual content to create the illusion that the virtual content remains in the same geographic position within the user's real world environment. Accordingly, a user may move around a virtual object presented by the augmented reality device in the same way the user would a physical object.

To convincingly create the illusion that the virtual object is in the user's real world environment, the augmented reality device has to update presentation of the virtual object almost instantaneously on movement of the device. However, virtual content can take a longer time to be updated because the AR display device has to process the environmental data, render the virtual content, and then project the virtual content. This latency can also be referred to as "motion-to-photon latency." Any perceivable motion-to-photon latency diminishes the user's experience.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

Augmented Reality (AR) applications allow a user to experience information, such as in the form of a virtual object rendered in a display of an AR display device (also referred to as a display device). The rendering of the virtual object may be based on a position of the display device relative to a physical object or relative to a frame of reference (external to the display device) so that the virtual object correctly appears in the display. The virtual object appears aligned with a physical object as perceived by the user of the AR display device. Graphics (e.g., graphical elements containing instructions and guides) appear to be attached to a physical object of interest. In order to do this, the AR display device detects the physical object and tracks a pose of the AR display device relative to a position of the physical object. A pose identifies a position and orientation of the object relative to a frame of reference or relative to another object.

One problem with implementing AR is latency associated with presenting virtual content. As the user moves the AR display device, the user's view of the real world environment changes instantaneously. The virtual content takes a longer time to change because the AR display device has to process the environmental data with Inertial Measurement Unit (IMU) data, render the virtual content, and project the virtual content in front of the user's field of view. This latency is defined and referred hereto as the "motion-to-photon latency" (e.g., the duration between the user moving the AR display device (or a tracked object such as a hand) and the presentation of its virtual content adapting to that specific motion). Motion-to-photon latency causes the virtual content to appear jittery or lagging, and diminishes the user's augmented reality experience.

Figure 5:
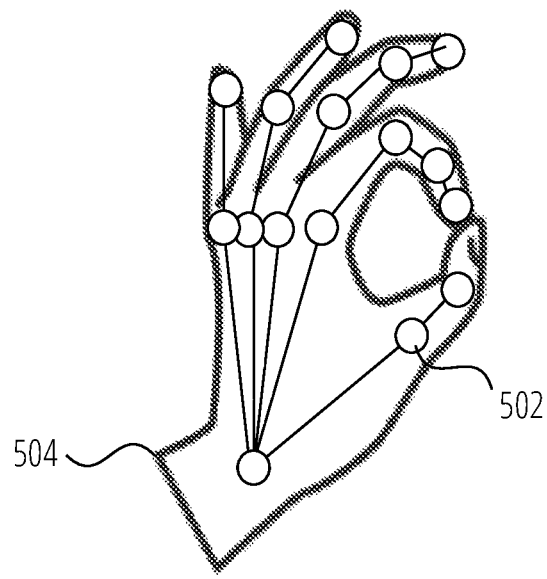
FIG. 5 illustrates an example of an annotation in accordance with one example embodiment.

The present application describes a method to significantly reduce the latency of annotations for vision-only trackers such as hand-tracking in Augmented Reality use cases. Annotations are simple visual representations. For example, in the case of hand-tracking, the hands are often visualized with simple connected dots as illustrated in FIG. 5.

Existing solutions do not address the issue of motion-to photon latency for hand-tracking. Instead, rendering visualizations of tracked hands is treated as a conventional object tracking and visualization problem. This conventional tracking and visualization leads to a very long pipeline with many stages resulting in a long overall duration. For example, traditional hand-tracking solutions in AR devices have a motion-to-photon latency range of about 100 ms.

The present application describes a system and method for reducing motion-to-photon latency of annotations (e.g., fingers tracking annotations) for hand-tracking in AR. For example, the present application takes advantage of certain simple rendering operations being short and predictable in their duration and can therefore be scheduled in advance. In one example embodiment, the system uses the tracking results of a next camera frame to draw "simple annotations" for the current frame, right before rendering (based on the current frame) finishes. As such, these annotations have one frame less of latency. The term "simple annotations" refer to annotations with minimal components (e.g., lines and dots). Examples of non-simple annotations include user interface elements or hand-meshes.

In one example embodiment, the present application describes a method for reducing motion-to-photon latency for hand tracking in AR devices. In one aspect, the method includes accessing a first frame from a camera of an Augmented Reality (AR) device, tracking, using a computer vision engine of the AR device, a first image of a hand in the first frame, rendering, using a render engine of a Graphical Processing Unit (GPU) of the AR device, virtual content based on the tracking of the first image of the hand in the first frame, accessing a second frame from the camera before the rendering of the virtual content is completed, the second frame immediately following the first frame, tracking, using the computer vision engine of the AR device, a second image of the hand in the second frame, generating an annotation based on tracking the second image of the hand in the second frame, forming an annotated virtual content based on the annotation and the virtual content, and displaying the annotated virtual content in a display of the AR device.

As a result, one or more of the methodologies described herein facilitate solving the technical problem of motion-to-photon latency in AR devices. The presently described method provides an improvement to an operation of the functioning of a computer by reducing latency for hand-tracking annotations in AR devices. As such, one or more of the methodologies described herein may obviate a need for certain efforts or computing resources. Examples of such computing resources include Processor cycles, network traffic, memory usage, data storage capacity, power consumption, network bandwidth, and cooling capacity.

Figure 1:
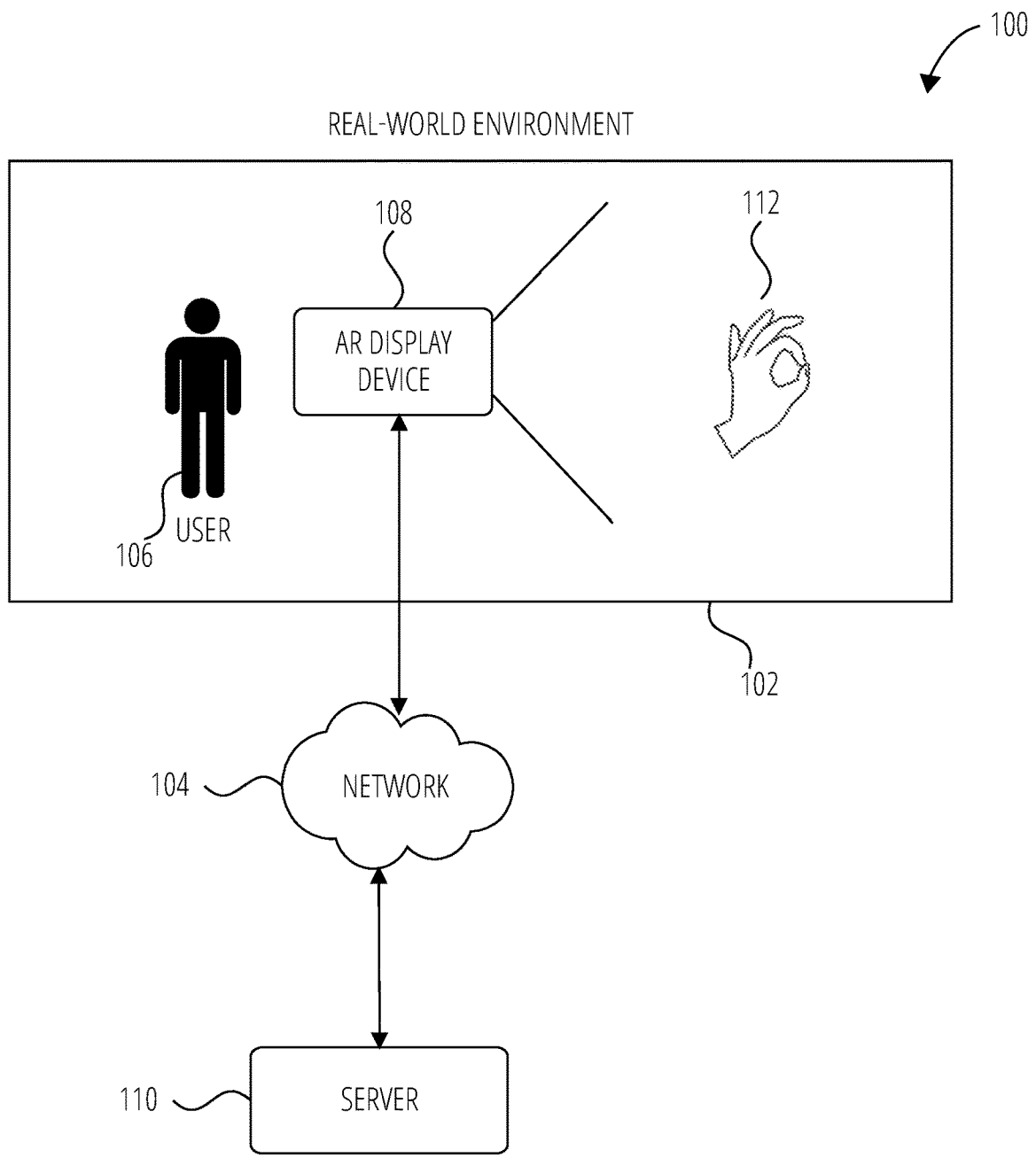
FIG. 1 is a block diagram illustrating a network environment for operating an AR display device in accordance with one example embodiment.

FIG. 1 is a network diagram illustrating a network environment 100 suitable for operating an AR display device 108, according to some example embodiments. The network environment 100 includes an AR display device 108 and a server 110, communicatively coupled to each other via a network 104. The AR display device 108 and the server 110 may each be implemented in a computer system, in whole or in part, as described below with respect to FIG. 13. The server 110 may be part of a network-based system. For example, the network-based system may be or include a cloud-based server system that provides additional information, such as virtual content (e.g., three-dimensional models of virtual objects) to the AR display device 108.

A user 106 operates the AR display device 108. The user 106 may be a human user (e.g., a human being), a machine user (e.g., a computer configured by a software program to interact with the AR display device 108), or any suitable combination thereof (e.g., a human assisted by a machine or a machine supervised by a human). The user 106 is not part of the network environment 100, but is associated with the AR display device 108.

The AR display device 108 may be a computing device with a display such as a smartphone, a tablet computer, or a wearable computing device (e.g., watch or glasses). The computing device may be hand-held or may be removably mounted to a head of the user 106. In one example, the display may be a screen that displays what is captured with a camera of the AR display device 108. In another example, the display of the device may be transparent such as in lenses of wearable computing glasses. In another example embodiment, the display may be non-transparent and wearable by the user to cover the field of vision of the user.

The user 106 operates an application of the AR display device 108. The application may include an AR application configured to provide the user 106 with an experience triggered by a tracked physical object (e.g., hand 112). For example, the user 106 may point a camera of the AR display device 108 to capture an image of his/her hand 112. The hand 112 is tracked and recognized locally in the AR display device 108 using a local context recognition dataset module of the AR application of the AR display device 108. The local context recognition dataset module may include a library of virtual objects associated with real-world physical objects or references. In one example, the AR application generates additional information corresponding to the image (e.g., a three-dimensional model) and presents this additional information in a display of the AR display device 108 in response to identifying the hand 112. If the captured image is not recognized locally at the AR display device 108, the AR display device 108 downloads additional information (e.g., the three-dimensional model) corresponding to the captured image, from a database of the server 110 over the network 104.

The AR display device 108 includes a tracking system (not shown). The tracking system tracks the pose (e.g., position and orientation) of the AR display device 108 relative to the real-world environment 102 using optical sensors (e.g., depth-enabled 3D camera, image camera), inertial sensors (e.g., gyroscope, accelerometer), wireless sensors (Bluetooth, Wi-Fi), GPS sensor, and audio sensor to determine the location of the AR display device 108 within the real-world environment 102. In another example embodiment, the tracking system tracks the pose of the hand 112 in video frames captured by the camera of the AR display device 108.

In one example embodiment, the server 110 may be used to detect and identify the hand 112 (or a tracked physical object) based on sensor data (e.g., image and depth data) from the AR display device 108, determine a pose of the AR display device 108 and a pose of the hand 112 based on the sensor data. The server 110 can also generate a virtual object based on the pose of the AR display device 108 and the hand 112. The server 110 communicates the virtual object to the AR display device 108. The object recognition, tracking, and AR rendering can be performed on either the AR display device 108, the server 110, or a combination between the AR display device 108 and the server 110.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 6 to FIG. 8. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 104 may be any network that enables communication between or among machines (e.g., server 110), databases, and devices (e.g., AR display device 108). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof.

Figure 2:
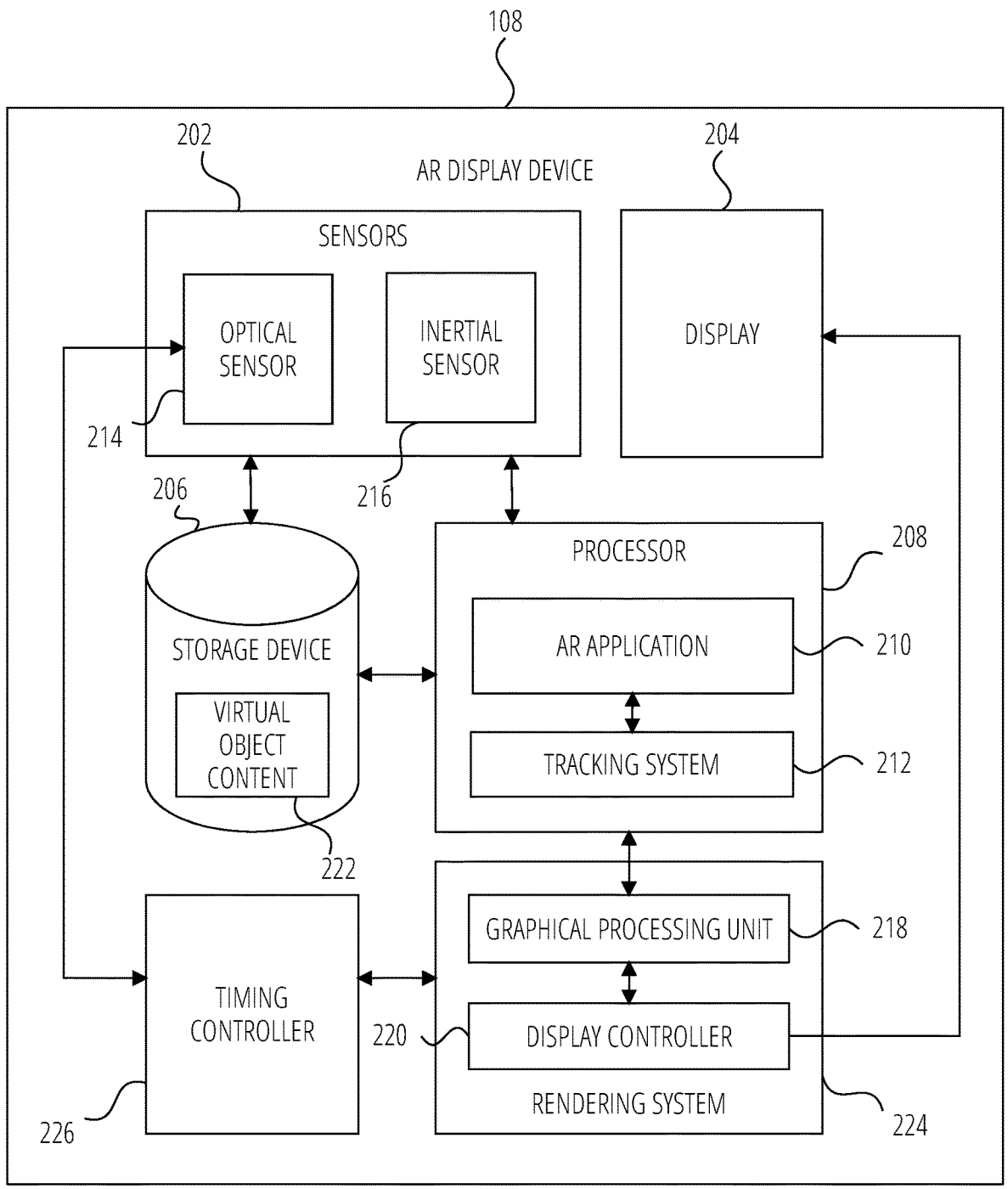
FIG. 2 is a block diagram illustrating an AR display device in accordance with one example embodiment.

FIG. 2 is a block diagram illustrating modules (e.g., components) of the AR display device 108, according to some example embodiments. The AR display device 108 includes sensors 202, a display 204, a processor 208, a rendering system 224, and a storage device 206. Examples of AR display device 108 include a head-mounted device, a wearable computing device, a desktop computer, a vehicle computer, a tablet computer, a navigational device, a portable media device, or a smart phone.

The sensors 202 include, for example, an optical sensor 214 (e.g., camera such as a color camera, a thermal camera, a depth sensor and one or multiple grayscale, global shutter tracking cameras) and an inertial sensor 216 (e.g., gyroscope, accelerometer). Other examples of sensors 202 include a proximity or location sensor (e.g., near field communication, GPS, Bluetooth, Wi-Fi), an audio sensor (e.g., a microphone), or any suitable combination thereof. It is noted that the sensors 202 described herein are for illustration purposes and the sensors 202 are thus not limited to the ones described above.

The display 204 includes a screen or monitor configured to display images generated by the processor 208. In one example embodiment, the display 204 may be transparent or semi-transparent so that the user 106 can see through the display 204 (in AR use case). In another example, the display 204, such as a LCOS display, presents each frame of virtual content in multiple presentations.

The processor 208 includes an AR application 210 and a tracking system 212. The AR application 210 detects and tracks the hand 112 using computer vision. The AR application 210 retrieves a virtual object (e.g., 3D object model) based on the tracked image of the hand 112. The AR application 210 renders the virtual object in the display 204. In an AR scenario, the AR application 210 generates annotations/virtual content that are overlaid (e.g., superimposed upon, or otherwise displayed in tandem with) on an image of the hand 112 captured by the optical sensor 214. The annotations/virtual content may be manipulated by changing a pose of the hand 112 (e.g., its physical location, orientation, or both) relative to the optical sensor 214. Similarly, the visualization of the annotations/virtual content may be manipulated by adjusting a pose of the AR display device 108 relative to the hand 112. For a VR scenario, the AR application 210 displays the annotations/virtual content in the display 204 at a location (in the display 204) determined based on a pose of the hand 112.

In another example embodiment, the AR application 210 includes a contextual local image recognition module (not shown) configured to determine whether the captured image matches an image locally stored in a local database (e.g., storage device 206) of images and corresponding additional information (e.g., virtual model and interactive features) on the AR display device 108. In one example, the contextual local image recognition module retrieves a primary content dataset from the server 110, and generates and updates a contextual content dataset based on an image captured with the AR display device 108.

The tracking system 212 estimates a pose of the AR display device 108 and/or the pose of the hand 112. In one example, the tracking system 212 uses image data and corresponding inertial data from the optical sensor 214 and the inertial sensor 216 to track a location and pose of the AR display device 108 relative to a frame of reference (e.g., real-world environment 102). In one example, the tracking system 212 uses the sensor data to determine the three-dimensional pose of the AR display device 108. The three-dimensional pose is a determined orientation and position of the AR display device 108 in relation to the user's real-world environment 102. For example, the AR display device 108 may use images of the user's real-world environment 102, as well as other sensor data to identify a relative position and orientation of the AR display device 108 from physical objects in the real-world environment 102 surrounding the AR display device 108. The tracking system 212 continually gathers and uses updated sensor data describing movements of the AR display device 108 to determine updated three-dimensional poses of the AR display device 108 that indicate changes in the relative position and orientation of the AR display device 108 from the physical objects in the real-world environment 102. The tracking system 212 provides the three-dimensional pose of the AR display device 108 to the rendering system 224.

In another example, the tracking system 212 receives an image of the hand 112 from the optical sensor 214. The tracking system 212 then uses computer vision to track a pose of the hand 112 in the image. The pose of the hand 112 may be identified relative to the AR display device 108.

The rendering system 224 includes a Graphical Processing Unit 218 and a display controller 220. The Graphical Processing Unit 218 includes a render engine (not shown) that is configured to render a frame of a 3D model of a virtual object based on the virtual content provided by the AR application 210 and the pose of the AR display device 108 (or the pose of the hand 112). In other words, the Graphical Processing Unit 218 uses the three-dimensional pose of the AR display device 108 to generate frames of virtual content to be presented on the display 204. For example, the Graphical Processing Unit 218 uses the three-dimensional pose to render a frame of the virtual content such that the virtual content is presented at an appropriate orientation and position in the display 204 to properly augment the user's reality. As an example, the Graphical Processing Unit 218 may use the three-dimensional pose data to render a frame of virtual content such that, when presented on the display 204, the virtual content overlaps on the hand 112 in the user's real-world environment 102. The Graphical Processing Unit 218 generates updated frames of virtual content based on updated three-dimensional poses of the AR display device 108, which reflect changes in the position and orientation of the user in relation to the hand 112 in the user's real-world environment 102.

The Graphical Processing Unit 218 transfers the rendered frame to the display controller 220. The display controller 220 is positioned as an intermediary between the Graphical Processing Unit 218 and the display 204, receives the image data (e.g., annotated rendered frame) from the Graphical Processing Unit 218, provides the annotated rendered frame to the display 204.

In one example embodiment, the optical sensor 214 and the Graphical Processing Unit 218 both operate at the same rate/frequency (e.g., 60 Hz). A timing controller 226 controls the timing of the optical sensor 214 and the rendering of the Graphical Processing Unit 218 such that the optical sensor 214 provides a new frame and the tracking system 212 generates a new tracking based on the new frame before the display controller 220 sends the original rendered frame to the display 204. The operation of the timing controller 226 is described in more detail below with respect to FIG. 4.

The storage device 206 stores virtual object content 222. The virtual object content 222 includes, for example, a database of visual references (e.g., images, QR codes) and corresponding virtual content (e.g., three-dimensional model of virtual objects).

Any one or more of the modules described herein may be implemented using hardware (e.g., a Processor of a machine) or a combination of hardware and software. For example, any module described herein may configure a Processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
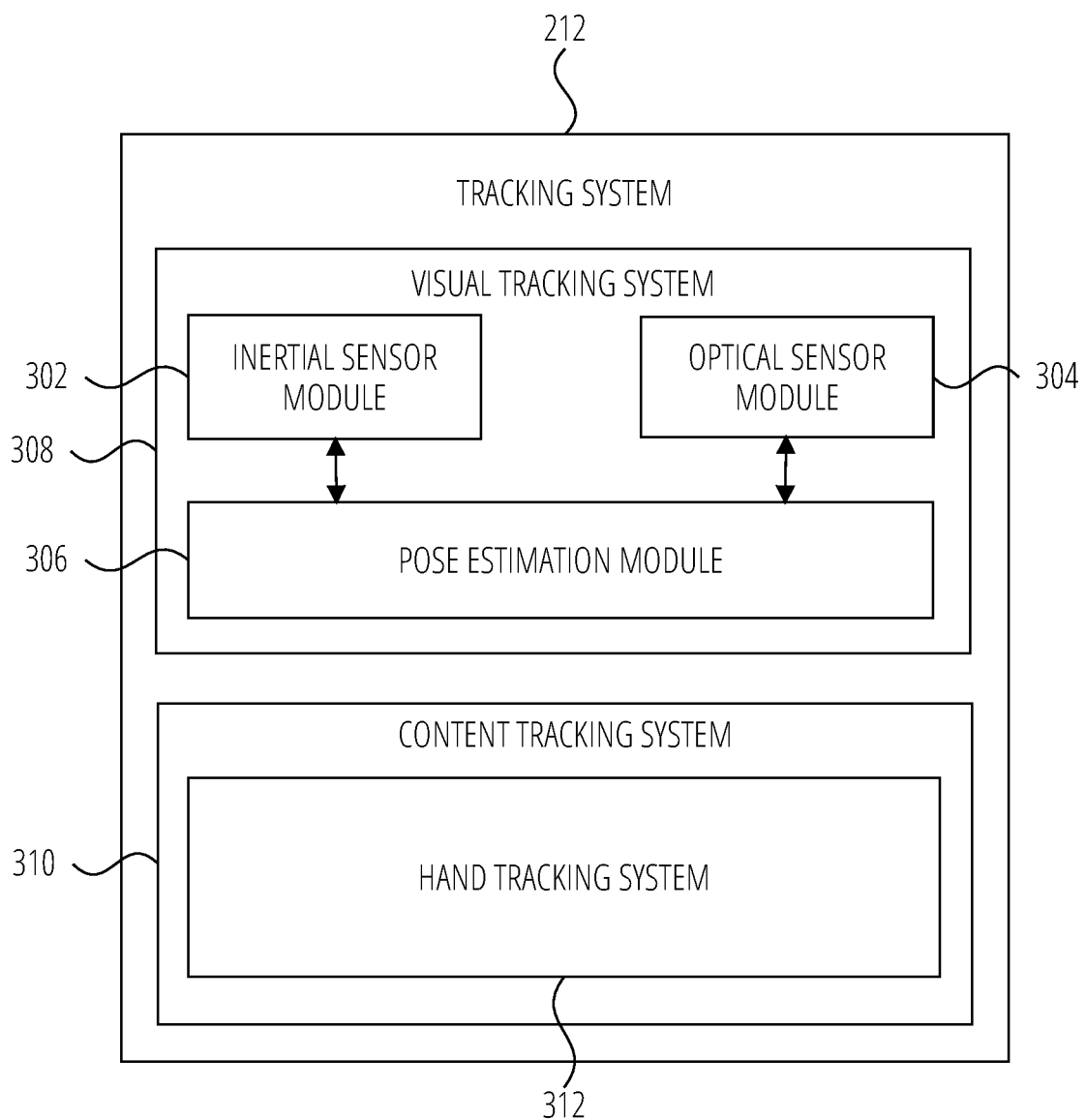
FIG. 3 is a block diagram illustrating a tracking system in accordance with one example embodiment.

FIG. 3 illustrates the tracking system 212 in accordance with one example embodiment. The tracking system 212 includes, for example, a visual tracking system 308 and a content tracking system 310.

The visual tracking system 308 includes an inertial sensor module 302, an optical sensor module 304, and a pose estimation module 306. The inertial sensor module 302 accesses inertial sensor data from the inertial sensor 216. The optical sensor module 304 accesses optical sensor data from the optical sensor 214.

The pose estimation module 306 determines a pose (e.g., location, position, orientation) of the AR display device 108 relative to a frame of reference (e.g., real-world environment 102). In one example embodiment, the pose estimation module 306 estimates the pose of the AR display device 108 based on 3D maps of feature points from images captured by the optical sensor 214 (via an optical sensor module 304) and from the inertial sensor data captured by the inertial sensor 216 (via inertial sensor module 302).

In one example, the pose estimation module 306 includes an algorithm that combines inertial information from the inertial sensor 216 and image information from the optical sensor 214 that are coupled to a rigid platform (e.g., AR display device 108) or a rig. A rig may consist of multiple cameras (with non-overlapping (distributed aperture) or overlapping (stereo or more) fields-of-view) mounted on a rigid platform with an IMU (e.g., rig may thus have at least one IMU and at least one camera). In another example embodiment, the presently described motion-to-photon latency optimization may operate with simpler tracking modules (e.g., one where only rotation data from IMU is tracked) and thus does not require image data from the optical sensor 214.

The content tracking system 310 includes a hand tracking system 312. The hand tracking system 312 uses computer vision to detect and track a location of a hand (within an image). In one example, the hand tracking system 312 detects and tracks the hand 112 of the user 106 or hands from another person in the image captured with the optical sensor 214. The hand tracking system 312 tracks a pose of the image of the hand 112 in the image frame captured from the optical sensor module 304.

Figure 4:
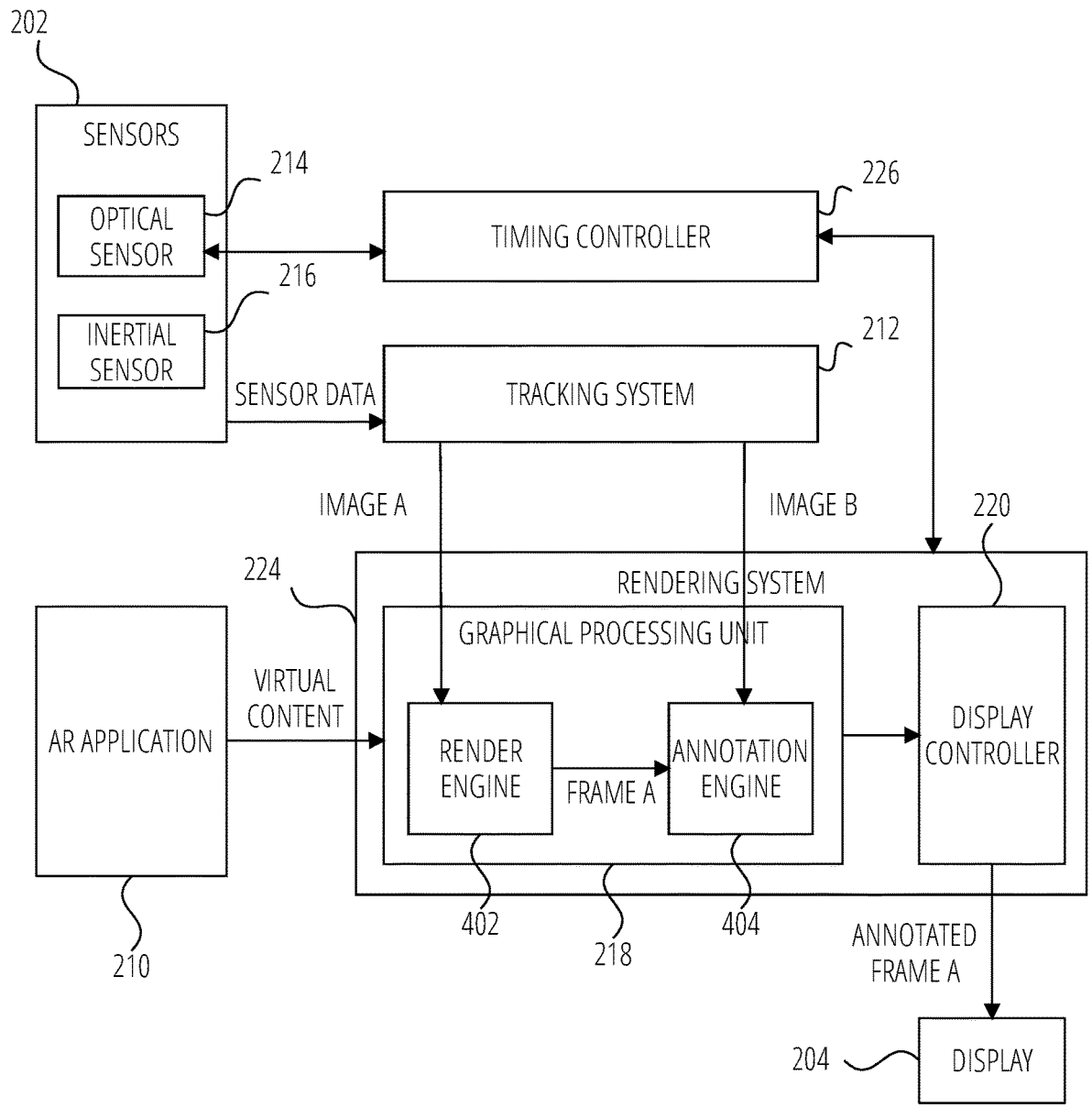
FIG. 4 is a block diagram illustrating an example process of low latency annotations in accordance with one example embodiment.

FIG. 4 is a block diagram illustrating an example process in accordance with one example embodiment. The tracking system 212 receives sensor data (e.g., image A) from sensors 202 to determine a pose of the AR display device 108 and/or a pose of the hand 112. The tracking system 212 provides the pose of the tracked hand 112 to the Graphical Processing Unit 218.

The Graphical Processing Unit 218 includes a render engine 402 and an annotation engine 404. The render engine 402 renders a frame (e.g., frame A) of virtual content (provided by the AR application 210) and at a location (in the display 204) based on the pose of the hand 112 (and/or the pose of the AR display device 108) as determined by the tracking system 212. The render engine 402 provides the rendered frame (e.g., frame A) to the annotation engine 404. The tracking system 212 identifies a latest pose of the hand 112 to the annotation engine 404 based on a latest image frame (e.g., image B) from the optical sensor 214. The tracking system 212 sends the latest tracked pose of the hand 112 to the annotation engine 404. The annotation engine 404 generates or draws "simple annotations" (e.g., hand-tracking lines and dots) on the frame A from the render engine 402.

The Graphical Processing Unit 218 provides the annotated rendered frame (e.g., annotated frame A) to the display controller 220. The display controller 220 communicates the annotated frame A to the display 204 for display.

In one example embodiment, the timing controller 226 controls a timing of the optical sensor 214 and a timing of the rendering system 224. Both optical sensor 214 and rendering system 224 may operate at the same frequency/rate (e.g., 60 Hz). The timing controller 226 selects a timing of the optical sensor 214 and a timing of the rendering system 224 such that tracking of the second image (e.g., image B) finishes sufficiently before the display controller 220 sends the annotated frame A to the display 204.

In another example embodiment, the tracking system 212 completes the tracking of the second image (e.g., image B) "immediately" before the render engine 402 completes the rendered virtual content (e.g., frame A), so that the annotation engine 404 can still draw annotations on the rendered virtual content before being processed by the display controller 220. The term "immediately" may refer to a period of time of a minimal duration that enables the annotation engine 404 to draw annotations before the rendered frame is sent to the display controller 220.

In one example, the optical sensor 214 and the rendering system 224, each have their own subsystem with their own timings. As such, the timing controller 226 controls and aligns the timings of the optical sensor 214 and the rendering system 224.

FIG. 5 illustrates an example of a "simple" annotation in accordance with one example embodiment. The annotations 502 are drawn on an image of the hand tracking model 504.

Figure 6:
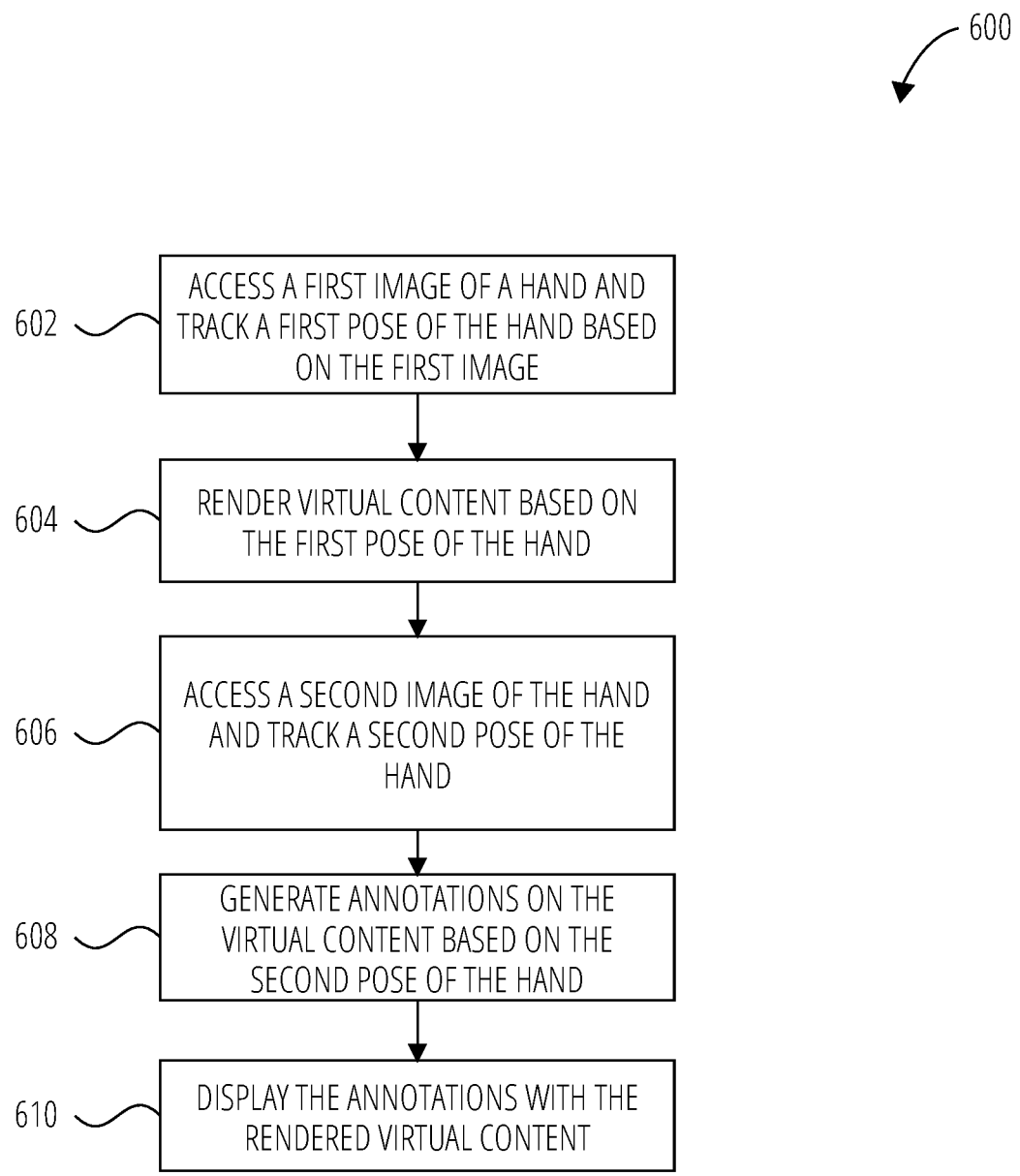
FIG. 6 is a flow diagram illustrating a method for reducing latency in an AR display device in accordance with one example embodiment.

FIG. 6 is a flow diagram illustrating a method for reducing latency in an AR display device in accordance with one example embodiment. Operations in the routine 600 may be performed by the AR display device 108, using Components (e.g., modules, engines) described above with respect to FIG. 2 and FIG. 4. Accordingly, the routine 600 is described by way of example with reference to the rendering system 224. However, it shall be appreciated that at least some of the operations of the routine 600 may be deployed on various other hardware configurations or be performed by similar Components residing elsewhere.

In block 602, the tracking system 212 accesses a first image of the hand 112 and tracks a first pose of the hand 112 based on the first image. In block 604, the render engine 402 renders virtual content based on the first pose of the hand 112. In block 606, the tracking system 212 accesses a second image of the hand 112 and tracks a second pose of the hand 112. In block 608, the annotation engine 404 generates annotations on the virtual content based on the second pose of the hand 112. In block 610, the display 204 displays the annotations with the rendered virtual content.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 7:
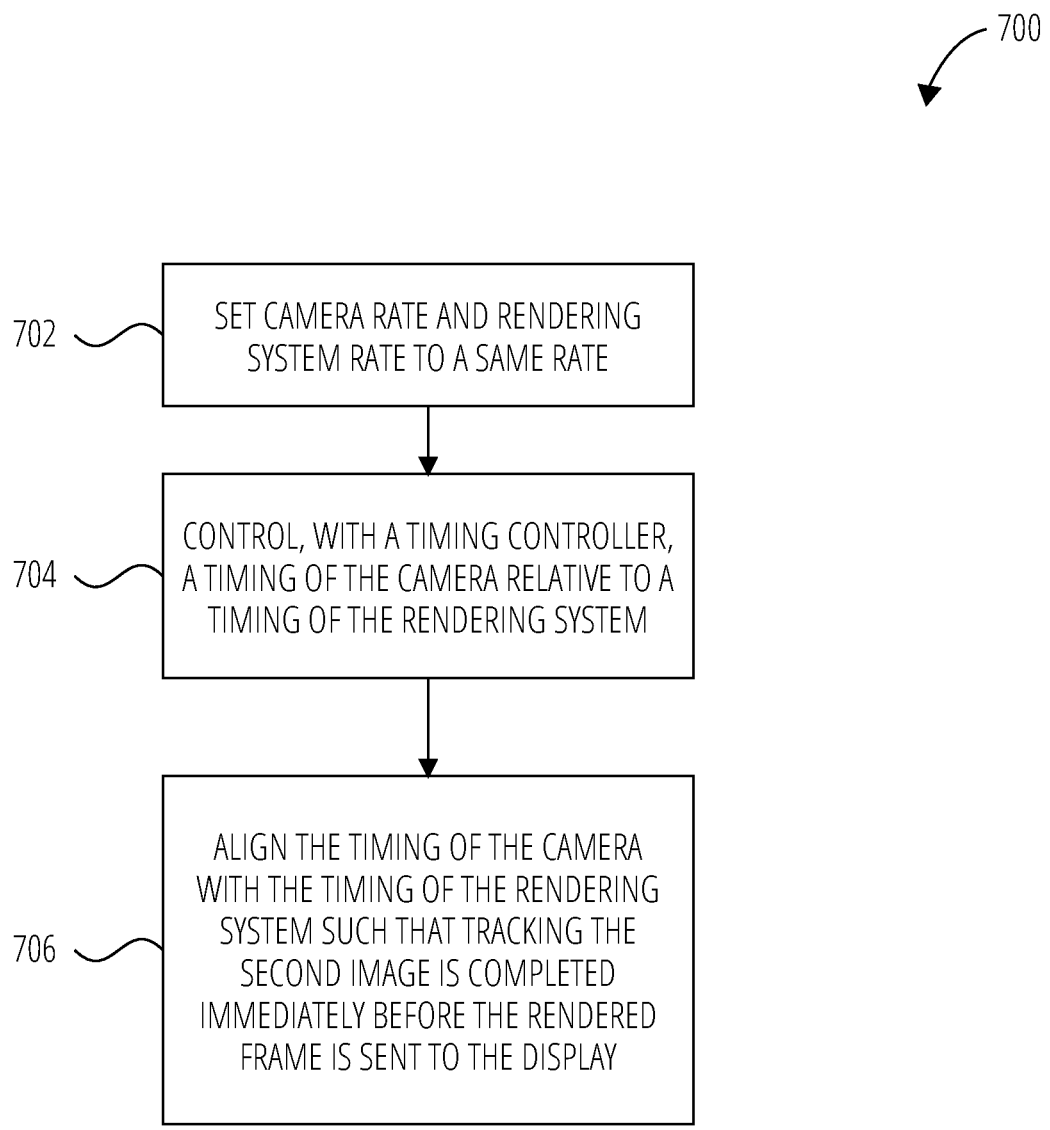
FIG. 7 is a flow diagram illustrating a method for reducing latency in an AR display device in accordance with one example embodiment.

FIG. 7 is a flow diagram illustrating a method for reducing latency in an AR display device in accordance with one example embodiment. Operations in the routine 700 may be performed by the AR display device 108, using Components (e.g., modules, engines) described above with respect to FIG. 2 and FIG. 4. Accordingly, the routine 700 is described by way of example with reference to the timing controller 226. However, it shall be appreciated that at least some of the operations of the routine 700 may be deployed on various other hardware configurations or be performed by similar Components residing elsewhere.

In block 702, the timing controller 226 sets or verifies that the camera rate and the rendering system rate are set to the same rate (e.g., 60 Hz). In block 704, the timing controller 226 controls/adjusts a timing of the optical sensor 214 relative to a timing of the rendering system 224. In block 706, the timing controller 226 aligns the timing of the optical sensor 214 with the timing of the rendering system 224 such that tracking the second image is completed immediately before the rendered frame is sent to the display 204. For example, if the optical sensor 214 runs at 60 Hz (16.6 ms), then after 10 ms of exposure, there would be a 6.6 ms period where the camera waits. The timing controller 226 aligns/times an operation of the optical sensor 214 with an operation of the rendering system 224 so that the tracking (e.g., tracking phase 1112 of FIG. 10) finishes right before the rendering (e.g., render phase 1008 of FIG. 10) (e.g., within 1 ms for 60 Hz). In one example, the tracking finishes right when the rendering finishes. In another example, the tracking does not finish substantially earlier than when the rendering finishes (e.g., greater than 1 ms for 60 Hz).

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 8:
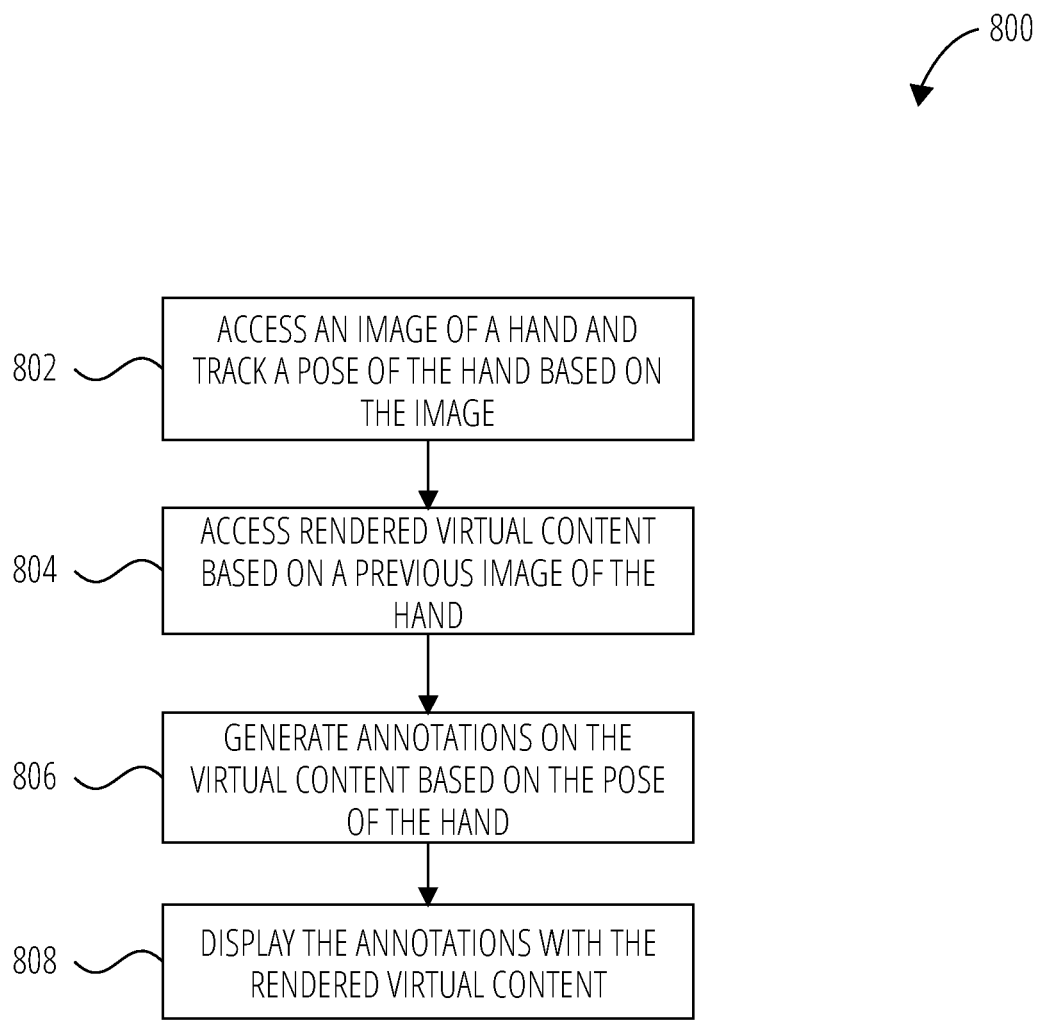
FIG. 8 is a flow diagram illustrating a method for reducing latency in an AR display device in accordance with another example embodiment.

FIG. 8 is a flow diagram illustrating a method for reducing latency in an AR display device in accordance with another example embodiment. Operations in the routine 800 may be performed by the AR display device 108, using Components (e.g., modules, engines) described above with respect to FIG. 2 and FIG. 4. Accordingly, the routine 800 is described by way of example with reference to the rendering system 224. However, it shall be appreciated that at least some of the operations of the routine 800 may be deployed on various other hardware configurations or be performed by similar Components residing elsewhere.

In block 802, the tracking system 212 accesses an image of the hand 112 and tracks a pose of the hand 112 based on the image. In block 804, the render engine 402 accesses rendered virtual content based on a previous image of the hand 112. In block 806, the annotation engine 404 generates annotations on the virtual content based on the pose of the hand 112. In block 808, the display 204 displays the annotations with the rendered virtual content.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 9:
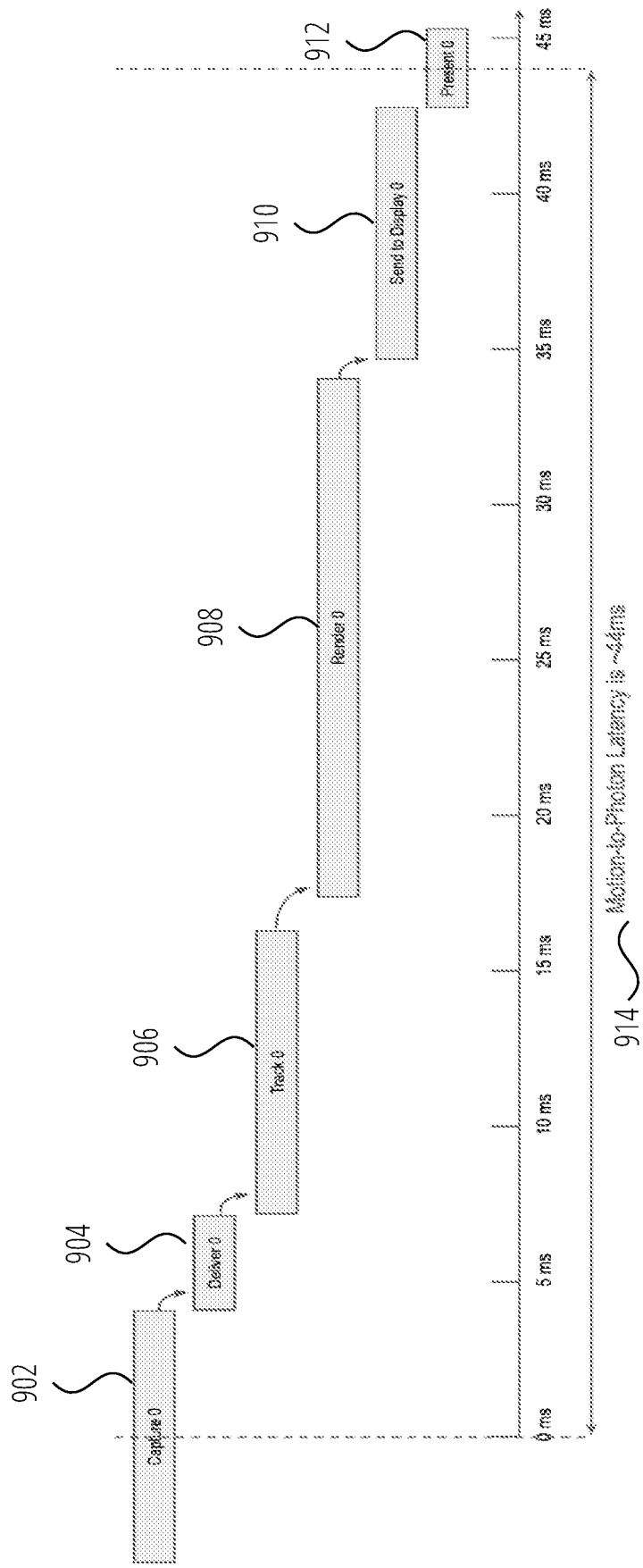
FIG. 9 is a block diagram illustrating example operation stages in accordance with a prior art.

FIG. 9 is a block diagram illustrating example operation stages in accordance with a prior art. The motion-to-photon latency 914 is about 44 ms and includes the following stages: capture phase 902, deliver phase 904, track phase 906, render phase 908, display send phase 910, and display phase 912. The capture phase 902 represents how long the optical sensor 214 takes to capture an image (e.g., about 8 ms). The deliver phase 904 represents how long a frame-readout from the image is delivered to computer vision algorithm (e.g., about 3 ms). The track phase 906 represents how long computer vision algorithm takes to process the image and track the image of the hand 112 (e.g., about 9 ms). The render phase 908 represents how long the render engine 402 takes to render virtual content based on the tracked image of the hand 112 (e.g., about 16 ms). The display send phase 910 represents how long it takes for the rendered frame to be delivered at the display controller 220 (e.g., about 8 ms). The display phase 912 represents how long it takes for the display 204 to display the rendered frame (e.g., about 2 ms).

Figure 10:
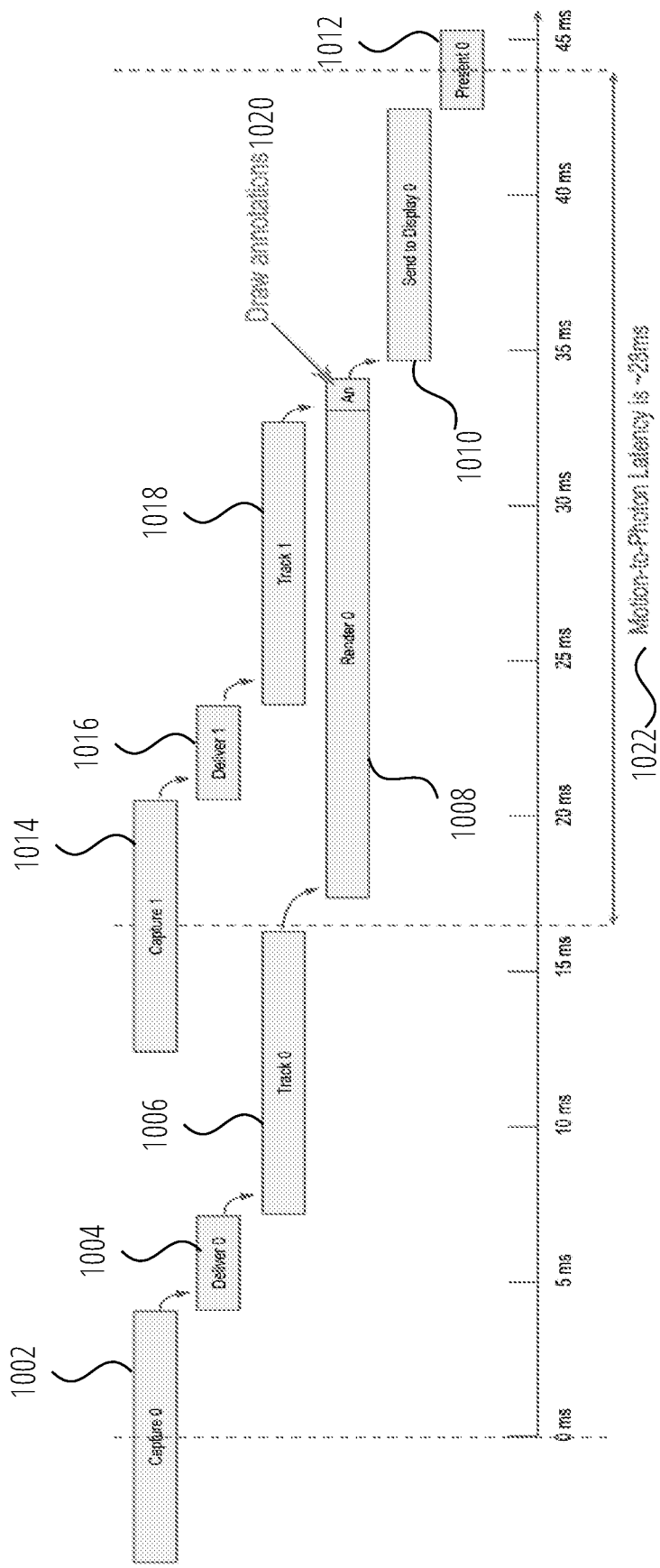
FIG. 10 is a block diagram illustrating example operation stages in accordance with one example embodiment.

FIG. 10 is a block diagram illustrating example operation stages in accordance with one example embodiment. The motion-to-photon latency 1022 is about 28 ms instead of 44 ms as illustrated in FIG. 9. The stages include: capture phase 1002, deliver phase 1004, tracking phase 1006, render phase 1008, display send phase 1010, present phase 1012, capture phase 1014, delivery phase 1016, and tracking phase 1018. The capture phase 1002 is similar to capture phase 902 of FIG. 9. The deliver phase 1004 is similar to deliver phase 904 of FIG. 9. The tracking phase 1006 is similar to track phase 906 of FIG. 9. The render phase 1008 is similar to render phase 908 of FIG. 9.

The tracking system 212 captures a next camera frame in capture phase 1014 and delivers the next camera frame at delivery phase 1016 to the hand tracking system 312. The hand tracking system 312 uses computer vision to identify the latest pose of the hand 112 based on the next camera frame at tracking phase 1018. The annotation engine 404 generates simple annotations at annotation phase 1020. The annotations from annotation phase 1020 are combined with the rendered content from render phase 1008 to generate an annotated frame. The annotated frame is sent to the display 204 at display send phase 1010. The display 204 presents the annotated frame at present phase 1012.

Figure 11:
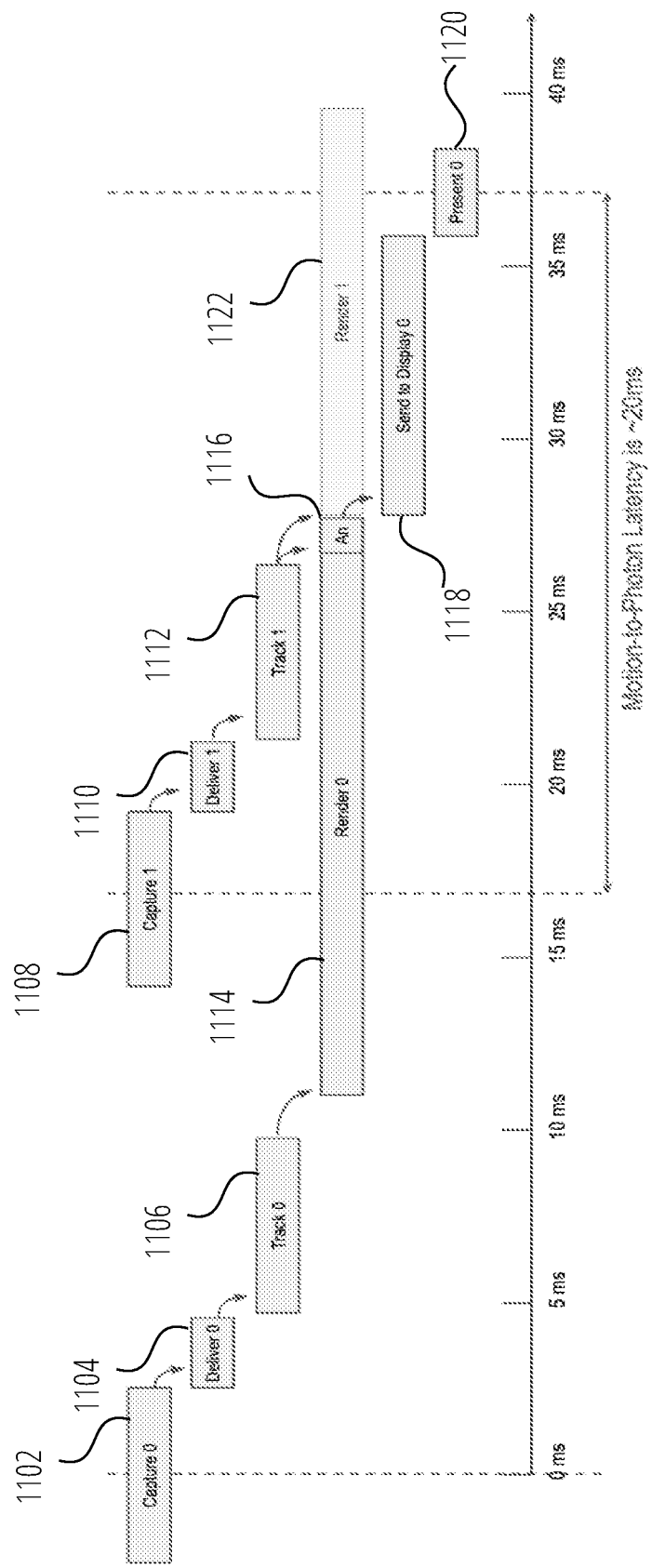
FIG. 11 is a block diagram illustrating example operation stages in accordance with another example embodiment.

FIG. 11 is a block diagram illustrating example operation stages in accordance with another example embodiment. The motion-to-photon latency 1022 is about 20 ms instead of 28 ms as illustrated in FIG. 10. The stages include: capture phase 1102, delivery phase 1104, tracking phase 1106, capture phase 1108, delivery phase 1110, tracking phase 1112, render phase 1114, annotation phase 1116, display send phase 1118, display phase 1120, and rendering phase 1122. The capture phase 1102 is similar to capture phase 902 of FIG. 9. The delivery phase 1104 is similar to deliver phase 904 of FIG. 9. The tracking phase 1106 is similar to track phase 906 of FIG. 9. The render phase 1114 is similar to render phase 908 of FIG. 9.

The tracking system 212 captures a next camera frame in capture phase 1108 and delivers the next camera frame at delivery phase 1110 to the hand tracking system 312. The hand tracking system 312 uses computer vision to identify the latest pose of the hand 112 based on the next camera frame at tracking phase 1112. The annotation engine 404 generates simple annotations at annotation phase 1116. The annotations from annotation phase 1116 are combined with the rendered content from render phase 1114 to generate an annotated frame (prior to rendering content based on the image from capture phase 1108). The annotated frame is sent to the display 204 at display send phase 1118. The display 204 presents the annotated frame at display phase 1120.

Figure 12:
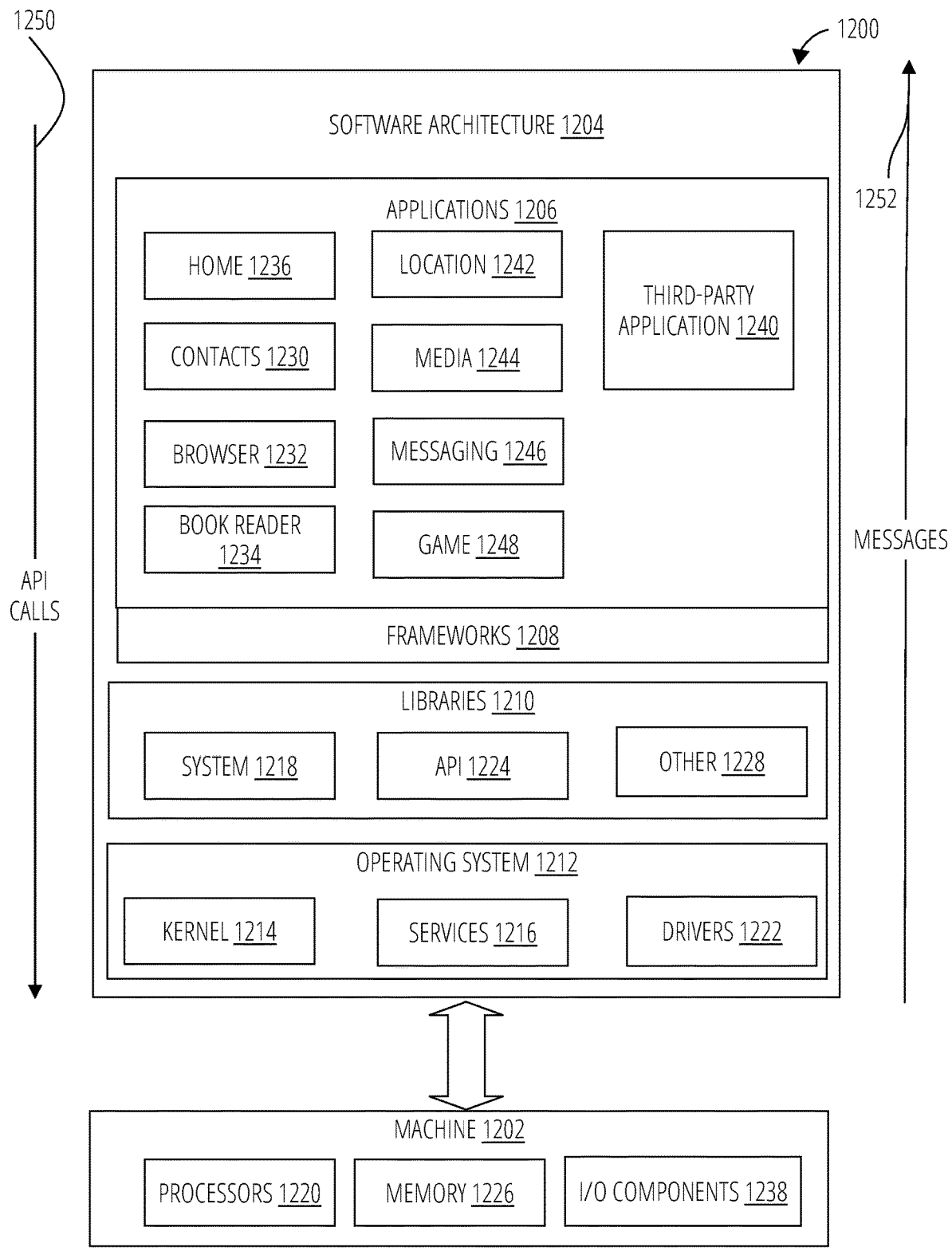
FIG. 12 is block diagram showing a software architecture within which the present disclosure may be implemented, according to an example embodiment.

FIG. 12 is a block diagram 1200 illustrating a software architecture 1204, which can be installed on any one or more of the devices described herein. The software architecture 1204 is supported by hardware such as a machine 1202 that includes Processors 1220, memory 1226, and I/O Components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, Processor management (e.g., scheduling), Component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1210 provide a low-level common infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a high-level common infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example embodiment, the applications 1206 may include a home application 1236, a contacts application 1230, a browser application 1232, a book reader application 1234, a location application 1242, a media application 1244, a messaging application 1246, a game application 1248, and a broad assortment of other applications such as a third-party application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or Linux OS, or other mobile operating systems. In this example, the third-party application 1240 can invoke the API calls 1250 provided by the operating system 1212 to facilitate functionality described herein.

Figure 13:
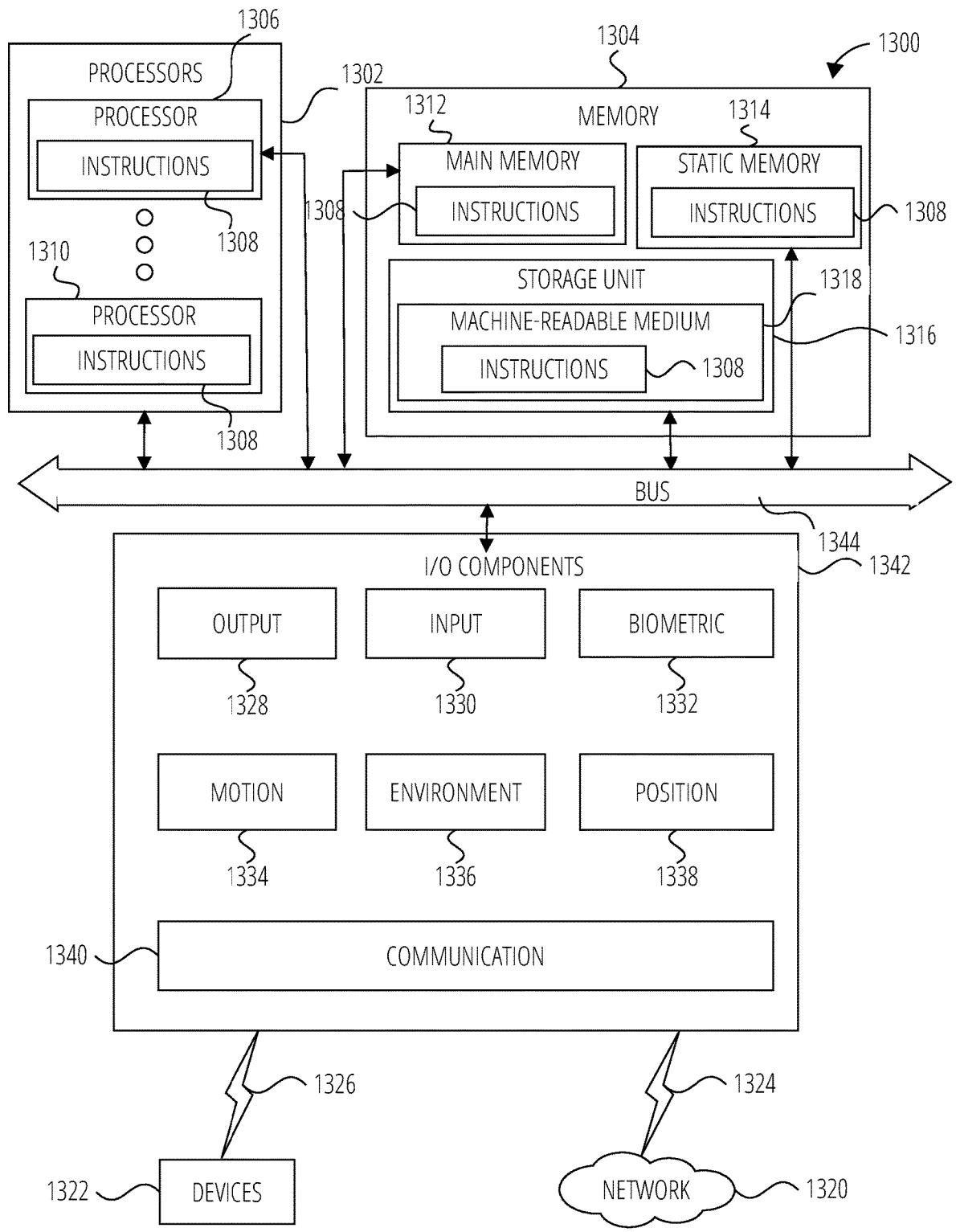
FIG. 13 is a diagrammatic representation of a machine in the form of a computer system within which a set of instructions may be executed for causing the machine to perform any one or more of the methodologies discussed herein, according to one example embodiment.

FIG. 13 is a diagrammatic representation of the machine 1300 within which instructions 1308 (e.g., software, a program, an application, an applet, an app, or other executable code) for causing the machine 1300 to perform any one or more of the methodologies discussed herein may be executed. For example, the instructions 1308 may cause the machine 1300 to execute any one or more of the methods described herein. The instructions 1308 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1308, sequentially or otherwise, that specify actions to be taken by the machine 1300. Further, while only a single machine 1300 is illustrated, the term "machine" shall also be taken to include a collection of machines that individually or jointly execute the instructions 1308 to perform any one or more of the methodologies discussed herein.

The machine 1300 may include Processors 1302, memory 1304, and I/O Components 1342, which may be configured to communicate with each other via a bus 1344. In an example embodiment, the Processors 1302 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1306 and a Processor 1310 that execute the instructions 1308. The term "Processor" is intended to include multi-core Processors that may comprise two or more independent Processors (sometimes referred to as "cores") that may execute instructions contemporaneously. Although FIG. 13 shows multiple Processors 1302, the machine 1300 may include a single Processor with a single core, a single Processor with multiple cores (e.g., a multi-core Processor), multiple Processors with a single core, multiple Processors with multiples cores, or any combination thereof.

The memory 1304 includes a main memory 1312, a static memory 1314, and a storage unit 1316, both accessible to the Processors 1302 via the bus 1344. The main memory 1304, the static memory 1314, and storage unit 1316 store the instructions 1308 embodying any one or more of the methodologies or functions described herein. The instructions 1308 may also reside, completely or partially, within the main memory 1312, within the static memory 1314, within machine-readable medium 1318 within the storage unit 1316, within at least one of the Processors 1302 (e.g., within the Processor's cache memory), or any suitable combination thereof, during execution thereof by the machine 1300.

The I/O Components 1342 may include a wide variety of Components to receive input, provide output, produce output, transmit information, exchange information, capture measurements, and so on. The specific I/O Components 1342 that are included in a particular machine will depend on the type of machine. For example, portable machines such as mobile phones may include a touch input device or other such input mechanisms, while a headless server machine will likely not include such a touch input device. It will be appreciated that the I/O Components 1342 may include many other Components that are not shown in FIG. 13. In various example embodiments, the I/O Components 1342 may include output Components 1328 and input Components 1330. The output Components 1328 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1330 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1342 may include biometric Components 1332, motion Components 1334, environmental Components 1336, or position Components 1338, among a wide array of other Components. For example, the biometric Components 1332 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1334 include acceleration sensor Components (e.g., accelerometer), gravitation sensor Components, rotation sensor Components (e.g., gyroscope), and so forth. The environmental Components 1336 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1338 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1342 further include communication Components 1340 operable to couple the machine 1300 to a network 1320 or devices 1322 via a coupling 1324 and a coupling 1326, respectively. For example, the communication Components 1340 may include a network interface Component or another suitable device to interface with the network 1320. In further examples, the communication Components 1340 may include wired communication Components, wireless communication Components, cellular communication Components, Near Field Communication (NFC) Components, Bluetooth® Components (e.g., Bluetooth® Low Energy), WiFi® Components, and other communication Components to provide communication via other modalities. The devices 1322 may be another machine or any of a wide variety of peripheral devices (e.g., a peripheral device coupled via a USB).

Moreover, the communication Components 1340 may detect identifiers or include Components operable to detect identifiers. For example, the communication Components 1340 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 1340, such as location via Internet Protocol (IP) geolocation, location via Wi-Fi® signal triangulation, location via detecting an NFC beacon signal that may indicate a particular location, and so forth.

The various memories (e.g., memory 1304, main memory 1312, static memory 1314, and/or memory of the Processors 1302) and/or storage unit 1316 may store one or more sets of instructions and data structures (e.g., software) embodying or used by any one or more of the methodologies or functions described herein. These instructions (e.g., the instructions 1308), when executed by Processors 1302, cause various operations to implement the disclosed embodiments.

The instructions 1308 may be transmitted or received over the network 1320, using a transmission medium, via a network interface device (e.g., a network interface Component included in the communication Components 1340) and using any one of a number of well-known transfer protocols (e.g., hypertext transfer protocol (HTTP)). Similarly, the instructions 1308 may be transmitted or received using a transmission medium via the coupling 1326 (e.g., a peer-to-peer coupling) to the devices 1322.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

EXAMPLES

Example 1 is a method comprising: accessing a first frame from a camera of an Augmented Reality (AR) device; tracking, using a computer vision engine of the AR device, a first image of a hand in the first frame; rendering, using a render engine of a Graphical Processing Unit (GPU) of the AR device, virtual content based on the tracking of the first image of the hand in the first frame; accessing a second frame from the camera before the rendering of the virtual content is completed, the second frame immediately following the first frame; tracking, using the computer vision engine of the AR device, a second image of the hand in the second frame; generating an annotation based on tracking the second image of the hand in the second frame; forming an annotated virtual content based on the annotation and the virtual content; and displaying the annotated virtual content in a display of the AR device.

Example 2 includes the method of example 1, wherein the camera and the render engine operate at a same frequency.

Example 3 includes the method of example 2, wherein tracking the second image of the hand in the second frame is completed immediately before the render engine completes the rendering of the virtual content.

Example 4 includes the method of example 3, further comprising: aligning, using a timing controller, a timing of the camera with a timing of the render engine based on the computer vision engine tracking the second image of the hand in the second frame being completed immediately before the render engine completes the rendering of the virtual content.

Example 5 includes the method of example 1, wherein accessing the second frame is during the rendering of the virtual content.

Example 6 includes the method of example 1, wherein tracking the second image of the hand in the second frame is completed immediately before the rendering of the virtual content is completed.

Example 7 includes the method of example 1, wherein forming the annotated virtual content comprises: drawing fingers tracking annotations on the virtual content.

Example 8 is a computing apparatus comprising: a processor; and a memory storing instructions that, when executed by the processor, configure the apparatus to: access a first frame from a camera of an Augmented Reality (AR) device; track, using a computer vision engine of the AR device, a first image of a hand in the first frame; render, using a render engine of a Graphical Processing Unit (GPU) of the AR device, virtual content based on the tracking of the first image of the hand in the first frame; access a second frame from the camera before the rendering of the virtual content is completed, the second frame immediately following the first frame; track, using the computer vision engine of the AR device, a second image of the hand in the second frame; generate an annotation based on tracking the second image of the hand in the second frame; form an annotated virtual content based on the annotation and the virtual content; and display the annotated virtual content in a display of the AR device.

Example 9 includes the computing apparatus of example 8, wherein the camera and the render engine operate at a same frequency.

Example 10 includes the computing apparatus of example 9, wherein tracking the second image of the hand in the second frame is completed immediately before the render engine completes the rendering of the virtual content.

Example 11 includes the computing apparatus of example 10, wherein the instructions further configure the apparatus to: align, using a timing controller, a timing of the camera with a timing of the render engine based on the computer vision engine tracking the second image of the hand in the second frame being completed immediately before the render engine completes the rendering of the virtual content.

Example 12 includes the computing apparatus of example 8, wherein accessing the second frame is during the rendering of the virtual content.

Example 13 includes the computing apparatus of example 8, wherein tracking the second image of the hand in the second frame is completed immediately before the rendering of the virtual content is completed.

Example 14 includes the computing apparatus of example 8, wherein forming the annotated virtual content comprises: draw fingers tracking annotations on the virtual content.

Example 15 is a non-transitory computer-readable storage medium, the computer-readable storage medium including instructions that when executed by a computer, cause the computer to: access a first frame from a camera of an Augmented Reality (AR) device; track, using a computer vision engine of the AR device, a first image of a hand in the first frame; render, using a render engine of a Graphical Processing Unit (GPU) of the AR device, virtual content based on the tracking of the first image of the hand in the first frame; access a second frame from the camera before the rendering of the virtual content is completed, the second frame immediately following the first frame; track, using the computer vision engine of the AR device, a second image of the hand in the second frame; generate an annotation based on tracking the second image of the hand in the second frame; form an annotated virtual content based on the annotation and the virtual content; and display the annotated virtual content in a display of the AR device.

Example 16 includes the computer-readable storage medium of example 15, wherein the camera and the render engine operate at a same frequency.

Example 17 includes the computer-readable storage medium of example 16, wherein tracking the second image of the hand in the second frame is completed immediately before the render engine completes the rendering of the virtual content.

Example 18 includes the computer-readable storage medium of example 17, wherein the instructions further configure the computer to: align, using a timing controller, a timing of the camera with a timing of the render engine based on the computer vision engine tracking the second image of the hand in the second frame being completed immediately before the render engine completes the rendering of the virtual content.

Example 19 includes the computer-readable storage medium of example 15, wherein accessing the second frame is during the rendering of the virtual content.

Example 20 includes the computer-readable storage medium of example 15, wherein tracking the second image of the hand in the second frame is completed immediately before the rendering of the virtual content is completed.

What is claimed is:

1. A method comprising:
    accessing a first frame from a camera of an Augmented Reality (AR) device;
    tracking, using a computer vision engine of the AR device, a first image of a hand in the first frame;
    rendering, using a render engine of a Graphical Processing Unit (GPU) of the AR device, virtual content based on the tracking of the first image of the hand in the first frame, wherein the camera and the render engine operate at a same frequency;
    accessing a second frame from the camera before the rendering of the virtual content is completed, the second frame immediately following the first frame;
    tracking, using the computer vision engine of the AR device, a second image of the hand in the second frame;
    generating an annotation based on tracking the second image of the hand in the second frame;
    forming an annotated virtual content based on the annotation and the virtual content; and
    displaying the annotated virtual content in a display of the AR device.

2. The method of claim 1, further comprising:
    adjusting a timing of the camera and a timing of the rendering engine such that tracking the second image of the hand in the second frame finishes before a display controller sends the annotated virtual content to the display.

3. The method of claim 1, wherein tracking the second image of the hand in the second frame is completed before the render engine completes the rendering of the virtual content.

4. The method of claim 1, further comprising:
    aligning, using a timing controller, a timing of the camera with a timing of the render engine based on the computer vision engine tracking the second image of the hand in the second frame being completed before the render engine completes the rendering of the virtual content.

5. The method of claim 1, wherein accessing the second frame is during the rendering of the virtual content.

6. The method of claim 1, wherein tracking the second image of the hand in the second frame is completed before the rendering of the virtual content is completed.

7. The method of claim 1, wherein forming the annotated virtual content comprises:
    drawing fingers tracking annotations on the virtual content.

8. An Augmented Reality (AR) device comprising:
    a camera;
    a display;
    a Graphical Processing Unit (GPU);
    a processor; and
    a memory storing instructions that, when executed by the processor, configure the AR device to:
    access a first frame from the camera;
    track, using a computer vision engine of the AR device, a first image of a hand in the first frame;
    render, using a render engine of the GPU, virtual content based on the tracking of the first image of the hand in the first frame, wherein the camera and the render engine operate at a same frequency;
    access a second frame from the camera before the rendering of the virtual content is completed, the second frame immediately following the first frame;
    track, using the computer vision engine of the AR device, a second image of the hand in the second frame;
    generate an annotation based on tracking the second image of the hand in the second frame;
    form an annotated virtual content based on the annotation and the virtual content; and
    display the annotated virtual content in the display.

9. The AR device of claim 8, wherein the instructions further configure the AR device to:
adjust a timing of the camera and a timing of the rendering engine such that tracking the second image of the hand in the second frame finishes before a display controller sends the annotated virtual content to the display.

10. The AR device of claim 8, wherein tracking the second image of the hand in the second frame is completed before the render engine completes the rendering of the virtual content.

11. The AR device of claim 8, wherein the instructions further configure the AR device to:
align, using a timing controller, a timing of the camera with a timing of the render engine based on the computer vision engine tracking the second image of the hand in the second frame being completed before the render engine completes the rendering of the virtual content.

12. The AR device of claim 8, wherein accessing the second frame is during the rendering of the virtual content.

13. The AR device of claim 8, wherein tracking the second image of the hand in the second frame is completed immediately before the rendering of the virtual content is completed.

14. The AR device of claim 8, wherein forming the annotated virtual content comprises:
drawing fingers tracking annotations on the virtual content.

15. A non-transitory computer-readable storage medium, the computer-readable storage medium including instructions that when executed by a computer, cause the computer to:
access a first frame from a camera of an Augmented Reality (AR) device;
track, using a computer vision engine of the AR device, a first image of a hand in the first frame;
render, using a render engine of a Graphical Processing Unit (GPU) of the AR device, virtual content based on the tracking of the first image of the hand in the first frame;
access a second frame from the camera before the rendering of the virtual content is completed, the second frame immediately following the first frame, wherein the camera and the render engine operate at a same frequency;
track, using the computer vision engine of the AR device, a second image of the hand in the second frame;
generate an annotation based on tracking the second image of the hand in the second frame;
form an annotated virtual content based on the annotation and the virtual content; and
display the annotated virtual content in a display of the AR device.

16. The computer-readable storage medium of claim 15, further comprising:
adjusting a timing of the camera and a timing of the rendering engine such that tracking the second image of the hand in the second frame finishes before a display controller sends the annotated virtual content to the display.

17. The computer-readable storage medium of claim 15, wherein tracking the second image of the hand in the second frame is completed before the render engine completes the rendering of the virtual content.

18. The computer-readable storage medium of claim 15, wherein the instructions further configure the computer to:
align, using a timing controller, a timing of the camera with a timing of the render engine based on the computer vision engine tracking the second image of the hand in the second frame being completed before the render engine completes the rendering of the virtual content.

19. The computer-readable storage medium of claim 15, wherein accessing the second frame is during the rendering of the virtual content.

20. The computer-readable storage medium of claim 15, wherein tracking the second image of the hand in the second frame is completed before the rendering of the virtual content is completed.

* * * * *